US010150593B2

United States Patent
Girard (10) Patent No.: US 10,150,593 B2
(45) Date of Patent: Dec. 11, 2018

(54) FOOD STATION COOKING OR WATER TRAY/PAN/CHAFING DISH WITH HEAT RESISTANT AND FLAME RESISTANT/RETARDANT WRAP, ROLL, TAPE, BAND OR PRINT DÉCOR AND STICKERS/EMBELLISHMENTS

(71) Applicant: Lorraine Girard, East Moriches, NY (US)

(72) Inventor: Lorraine Girard, East Moriches, NY (US)

( * ) Notice: Subject to any disclaimer, the term of this patent is extended or adjusted under 35 U.S.C. 154(b) by 55 days.

(21) Appl. No.: 15/411,997

(22) Filed: Jan. 21, 2017

(65) Prior Publication Data

US 2018/0208365 A1 Jul. 26, 2018

(51) Int. Cl.
| | |
|---|---|
| *A47J 37/07* | (2006.01) |
| *B65D 25/20* | (2006.01) |
| *A47J 43/00* | (2006.01) |
| *B65D 21/02* | (2006.01) |
| *B65D 25/24* | (2006.01) |

(52) U.S. Cl.
CPC .......... *B65D 25/205* (2013.01); *A47J 43/00* (2013.01); *B65D 21/0233* (2013.01); *B65D 25/24* (2013.01)

(58) Field of Classification Search
USPC ................ 126/38; 312/401, 406; 219/448.11
See application file for complete search history.

(56) References Cited

U.S. PATENT DOCUMENTS

| | | | |
|---|---|---|---|
| 3,043,943 A | * | 7/1962 | Moot ................. A61F 7/02 219/448.11 |
| 5,287,800 A | | 2/1994 | Orednick |
| 5,468,892 A | | 11/1995 | de Riese-Meyer et al. |
| 5,702,806 A | | 12/1997 | O'Dell et al. |
| 5,772,753 A | | 6/1998 | Valenti |
| 5,819,640 A | | 10/1998 | Cuomo et al. |
| 5,866,207 A | | 2/1999 | O'Dell et al. |
| 6,067,698 A | | 5/2000 | Silvera-Langley |
| 6,548,689 B1 | | 4/2003 | Pratt, III |
| 6,773,799 B1 | | 8/2004 | Persson |
| 7,279,659 B2 | | 10/2007 | Gagas et al. |
| D645,296 S | | 9/2011 | Saboe |
| 8,629,654 B2 | | 1/2014 | Partovi |

(Continued)

OTHER PUBLICATIONS

X-J flexible fire-retardant /decorative fabric tape/ conductive fabric tape advertised online at least as early as Jan. 18, 2017 from the website: https://www.alibaba.com/product-detail/XJ-flexible-fire-retardant-decorative-fabric_60421323016.html.

(Continued)

*Primary Examiner* — Avinash Savani
(74) *Attorney, Agent, or Firm* — Robert J. Hess; Hess Patent Law Firm (57) ABSTRACT

A food station decoration is provided on or over sidewalls of a pan, tray or chafing dish. The food station decoration is heat resistant and flame resistant or flame retardant. The food station decoration may be a pattern printed on a band, wrap, roll, tape or sticker or a coated surface of aluminum. The pattern has different colors distributed throughout the pattern. The ink or other substance used to provide color to the pattern as well as any adhesive or coating needs to be heat resistant and flame resistant or flame retardant.

17 Claims, 9 Drawing Sheets

(56) References Cited

U.S. PATENT DOCUMENTS

| | | |
|---|---|---|
| 9,095,005 B2 | 7/2015 | Reischmann et al. |
| 9,474,414 B2 | 10/2016 | Yuen |
| 2005/0079339 A1* | 4/2005 | Riddle .................. B44C 5/0469 428/313.7 |

OTHER PUBLICATIONS

Chafing Dishes & Aluminum Pans, Party City, 2017, at the website: http://www.partycity.com/product/chafing+dishes+aluminum+pans.do.

* cited by examiner

FOOD STATION COOKING OR WATER TRAY/PAN/CHAFING DISH WITH HEAT RESISTANT AND FLAME RESISTANT/RETARDANT WRAP, ROLL, TAPE, BAND OR PRINT DÉCOR AND STICKERS/EMBELLISHMENTS

BACKGROUND OF THE INVENTION

Field of the Invention

The invention relates to a food station having a pan or tray whose sidewalls are covered by a decorative pattern. The decoration may be a colored pattern on a roll, tape, wrap or band fitted to cover the sidewalls, a colored pattern of digitally printed inks applied to the sidewalls, and/or a sticker/embellishment applied to the sidewalls or on the colored pattern.

Discussion of Related Art

Almost any event, party, gathering, celebration, or get together includes food and drink being served. Meetings for commercial, business and networking purposes often are scheduled during a meal such as a breakfast, lunch or dinner meeting. Whether the food is part of a breakfast, lunch or dinner or a combination thereof, or no particular meal at all, it is essential that food be made available.

At a typical event, prepared food is served in a manner where the guests can choose from several different food choices or options. While the food could be served to the guests, it is often preferable to have the guests serve themselves from a variety of premade foods. For example, a barbeque may have various chicken, meat, vegetable, starch, fruit and desert options. A breakfast may have eggs, pancakes, bacon, sausage, fruit, and cereal options. A lunch may have soup, sandwich, and salad and fruit options. Service often includes a line of the options for the guests to help themselves or request a server to provide from the options of their choosing. Often, such a line up of various food options at food stations is called a buffet.

On a buffet or food line up, it is necessary to keep certain of the food options warm while making the food available for guests to help themselves or be served. To accomplish these goals, serving trays such as cooking and water pans are often used. The pans are heated in an oven and then placed on the buffet or serving line. A pan or tray filled with the food can be placed on a holding cradle or frame and over a flame from, for example, a STERNO burner, to be kept warm throughout the event. A water pan, which is simply a pan that could be filled with water, can be kept underneath a pan filled with food, so that the STERNO burner heats the water and the water then warms the food indirectly to avoid the food from getting overcooked, too hot and/or too dry. Where the food does not need to be kept warm or heated, the pans or trays are still used for ease of service on the food line up or buffet.

For example, U.S. Pat. No. 5,819,640 mentions:

Chafers or chafing dishes are commonly used by restaurants and catering services for use in food service. A conventional chafer includes a rack or frame that contains a burner. A chafing dish tray is typically filled with water and is supported by the rack above the burner. Trays containing food are then placed into the chafing dish tray to be heated by the warmed water. The burner produces a flame that is commonly generated by combusted petroleum based gel contained within a can, such as the fuel can manufactured under the trademark, STERNO.

The cooking and water pans or trays or chafing dishes come in various sizes and depth. Typically, the pan is a rectangle, oval or a square shape, with a length of 10-24 inches and a width of 6-18 inches and a depth of 1-5 inches. However, other sizes are available and fall within the scope of this invention. The pans are constructed from a fire retardant material that is strong enough to hold the food but is fairly flexible to allow for bending and crushing for ease of disposal, such as aluminum or foil. The pans or trays are typically aluminum and therefore have a silver appearance, which is not aesthetically pleasing nor designed to enhance the occasion. It would enhance the event or occasion if the cooking and/or water pans or trays were decorated appropriately for the occasion. For example, the decoration could be festive for the holiday or party, appropriate for the host or for the celebration, etc.

Fire retardant material, including laminates, aluminum composites, and many other materials are available for many purposes. One such purpose is to create a pan. U.S. Pat. No. 6,548,689. It is disclosed that fire retardant laminates and other material can be used as a protective coating for various heat resistant and fire retardant applications and printing with a design of any choosing. U.S. Pat. Nos. 6,773,799, 5,866,207 and 5,702,806. There are disclosures of such materials being used for designs and protective coatings on cook tops, panels, barbeque pits, cradles, trivets, heating elements and electronic controls. See above and U.S. Pat. Nos. 9,474,414, 9,095,005, 8,629,654, 7,279,659 and 6,067,698. Fire retardant material is used as an adhesive to allow use of adhesives in hot environments. Such adhesives allow sticking instructions, warnings, directions, messages, and labels on items exposed to extreme heat such as from ovens, furnaces, fireplaces, fire pits, grills, engines, batteries, etc. For example, there are labels inside vehicle engines or hoods, on batteries, on a stove, oven or cook top, on a hotplate, pot, broiler, kettle, etc. The adhesives allow laminate, composite, alloy, aluminum composites, and various other materials to adhere or stick to the surfaces or objects described above.

Flame resistant materials are inherently nonflammable—the materials have flame resistance built into their chemical structures. These types of materials are designed to prevent the spread of fire and will not melt or drip when in close proximity to a flame. Because flame resistant products are not usually made from 100% flame resistant materials, they will burn, but will do so very, very slowly and are often self-extinguishing.

Flame retardant materials are those chemically treated to be slow burning or self-extinguishing when exposed to an open flame.

A difference between flame resistant and flame retardant fabrics lies in how each is made. Without a special chemical application, a product will not qualify as flame retardant. Similarly, without being made of certain nonflammable materials, products will not quality as fire resistant.

The use of decorative material with adhesives to enhance the décor of cooking or water pans and trays would be desirable. Such decorative pans and trays are not in use but would enhance the atmosphere, aesthetics, and the mood of the occasion or event wherein the food is being served.

SUMMARY OF INVENTION

A fire retardant material, including aluminum composites, laminates, or other material, will be adorned with printed décor, and then applied with adhesives to the exterior of cooking or water pans or trays. The material could be made as a flexible band or wrap, or as a roll or tape, that can be cut to a specific length so as to surround the circumference of the cooking/water pan or tray or chafing dish, or cover any side or portion of that circumference, and adhere thereto, with or without adhesives, and thereby enhance the aesthetic appearance of the pan or tray.

In another embodiment, the material could be smaller in size and unique in décor so that each 'piece' of material could be attached (like a sticker) to the exterior of the pan or tray to enhance the aesthetic appearance thereof. Such 'piece' of material could be an embellishment to the sidewall of the pan or tray or to the decorative band or wrap, or roll or tape, described herein above. In yet another embodiment, the material from which the pan or tray is constructed, such as the aluminum composition of a foil pan or tray or chafing dish, can be printed with a décor such that when the material is shaped into the pan or tray, the decorations will be visible.

DETAILED DESCRIPTION OF THE PREFERRED EMBODIMENT

Cooking and water trays and pans and chafing dishes are used conventionally to serve food at various events and occasions, including parties, celebrations, commercial and business/networking meetings, and social gatherings. Typically, whenever food is being provided in a buffet or food line service style, the food will be provided in cooking pans or trays and water pans or trays may be used to keep the food warm.

Cooking and water trays and chafing dishes are flame retardant and fire resistant so that they can be placed over a flame or STERNO burner to maintain the warmth of the contents. Likewise, before the food is placed on the buffet or food line, it is often heated in an oven. Therefore, the trays or pans are of a fire resistant material such as aluminum or foil. The food is often placed in a food holder, such as a tray or pan or chafing dish, which is kept warm by being placed over a STERNO burner directly or in a water pan, which is heated by a STERNO burner. The water pan often assists in keeping the contents of the cooking tray or pan warm, but not over-cooked or dry.

No matter the event or occasion, it is often advantageous to provide a décor to match or suit the theme. For example, there is festive décor for a holiday party, birthday, engagement, wedding, etc. Furthermore, there is thematic décor for the business, corporation, charity, group, etc. that is hosting the event. Still further, the décor could include messages, artwork, or other decorations. Yet, despite the need for providing appropriate décor, the cooking and water trays or pans or chafing dishes are never decorated and are always aesthetically unappealing even when surrounded by decorated tables, plates, napkins, walls and appropriately attired servers and even guests.

Laminates, aluminum composites and other materials are often used in hot environments to cover exposed surfaces and prevent exposure to the heat. U.S. Pat. Nos. 6,773,799, 5,866,207 and 5,702,806. For example, heat resistant laminates are used to coat stove tops, pots and kettles, surfaces of ovens, parts of a furnace, barbeque pit or fire place that are exposed or need to be adjusted or otherwise touched. See infra and also see U.S. Pat. Nos. 9,474,414, 9,095,005, 8,629,654, 7,279,659 and 6,067,698. Such materials are adhered to various surfaces through flame and heat and fire resistant adhesives. In some instances, the laminate or other material may include a printed label or message. That could be a warning, description, identification, etc.

Methods to print a pattern or a décor in laminates and aluminum compositions are described in prior art patents. Numerous devices, compositions and methods are disclosed to produce the material and to provide the pattern and décor. See above and U.S. Pat. Nos. 6,773,799, 5,866,207 and 5,702,806. Similarly, the use of heat and fire resistant materials and adhesives for cooking and other 'hot' applications are described in the patents listed above. However, such devices, compositions and methods have never been used to make decorative coverings or enhancements for cooking or water pans and trays.

Figure 1:
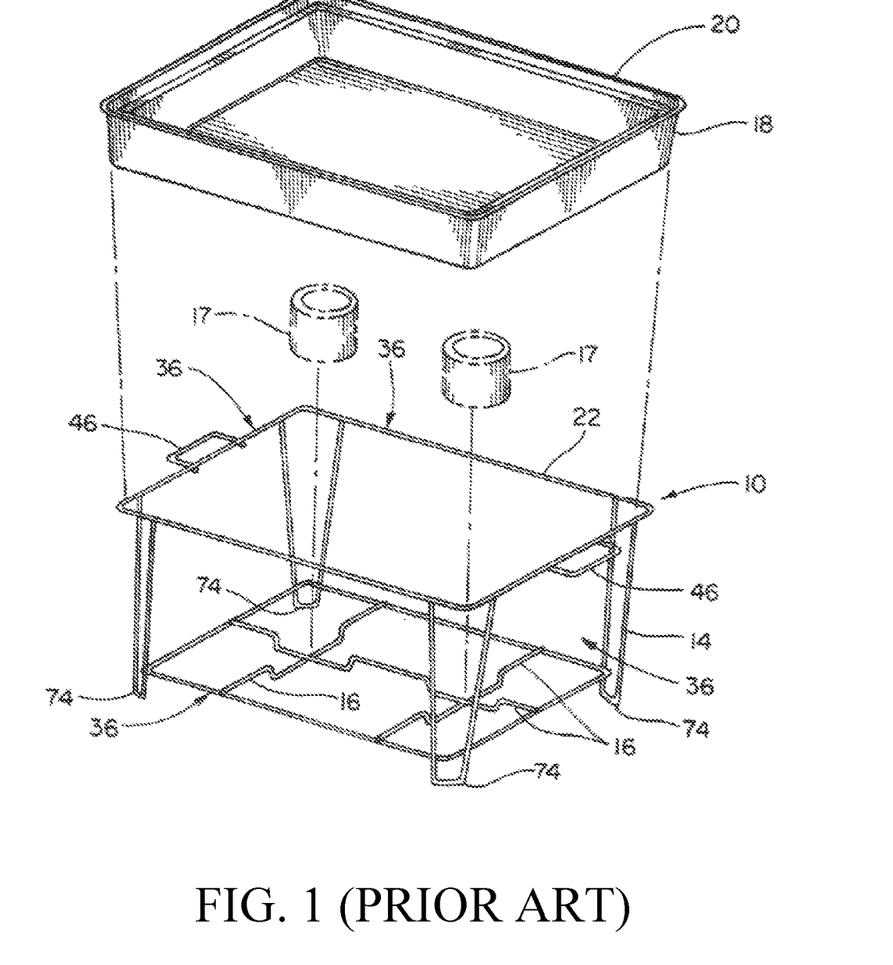
FIG. 1 is an exploded isometric view of a conventional food station with a water pan.

According to U.S. Pat. No. 5,819,640:

Referring now to the drawings, a chafer or assembly 10 is illustrated in FIG. 1. The assembly 10 generally includes a chafer structure or base 12 and a metal wire frame or rack 14 engageable within the chafer structure 12. The rack 14 includes cross members 16 adapted to receive or hold burners 17, which are used to produce the heat necessary to warm a chafer dish tray or lower pan 18 having peripheral flanges 20 for supported engagement by upper edges 22 of the rack 14.

The metal wire frame or rack 14 has four sides 36. Two wire handles 46 project from two opposite ones of the four sides 36. The metal wire frame or rack 14 is also equipped with four legs 74 that extend downwardly to support the chafer or assembly 10, which is conventional.

Preferably, the burners 17 are fuel cans which produce a flame that is commonly generated by combusted petroleum based gel contained within the can, such as the fuel can manufactured under the trademark, STERNO. The use STERNO and other similar types of fuel cans are commonly used by prior art chafers. Accordingly, the use of open flames and fuel cans increases the likelihood of a fire occurring, where the combusting petroleum gel may be subject to spilling out upon a table or serving area . . . .

. . . The chafer base 12 is formed of a fire retardant material. Preferably, the base 12 is formed of a molded high impact fire retardant plastic which is durable and light weight. These features are also deemed significant where the chafer structure 12 must be transported from storage spaces, to catering kitchens or restaurants, and to vehicles or carts for transportation to a site for setup on a table. Where this process and its reverse occur repeatably during the life of chafer, it is therefore desirous to have a durable lightweight chafer that is easy to transport and store, as provided by the present invention.

Figure 2:
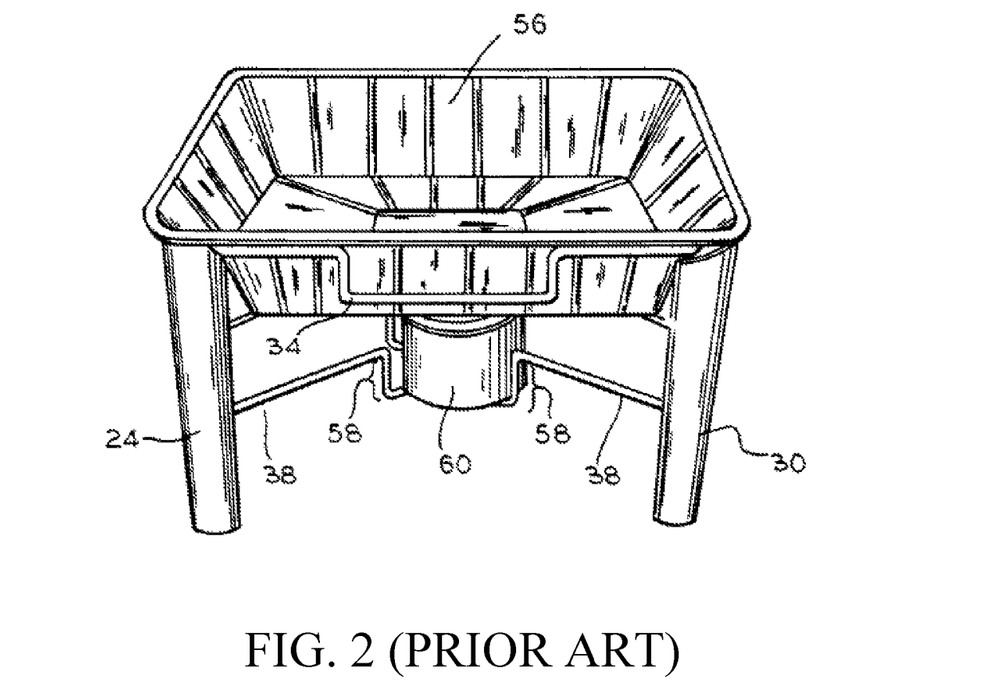
FIG. 2 is an isometric view of a conventional one-burner food station with an aluminum pan.

Turning to FIG. 2, U.S. Pat. No. 5,287,800 provides for burner support parts 58 of the bent wires or diagonal struts provide a recessed seat for receiving and supporting a single heating element 60. A pan receiving and support area is provided on the rectangular perimeter formed by the handle 34 and integral side support wires. The weight bearing support comes from the legs 24 & 30. Thus, a pan 56 may be set on the side support wires with the handles 34 projecting far enough beyond the pan to provide means for easily lifting for moving.

Figure 3:
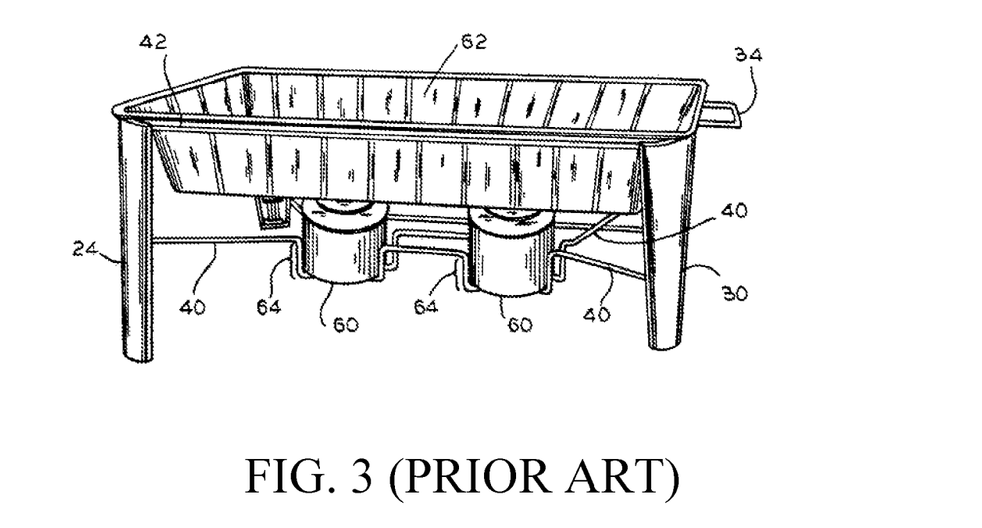
FIG. 3 is an isometric view of a conventional two-burner food station with an aluminum pan.

Turning to FIG. 3, U.S. Pat. No. 5,287,800 provides for a two-burner stand with the same legs 24 and 30 of FIG. 2. The bent wires 40, 42 are longer than the corresponding parts 36, 38 in the one burner stove of FIG. 2. The diagonal struts 40, 40 of the frame of FIG. 3 have two burner support parts 64 forming two recessed seats for receiving two heating elements 60, 60. Thus, the relatively long pan 62 is supported by the two burner stand. A pan or pans 62 rest on the rectangular perimeter provided by the bent wires forming the handles 34 and the side supports 42. Some caterers may place a smaller pan such as a two-inch deep pan inside one or more larger pans such as a two and one half inch deep pan in order to provide room for water when it is desirable to have steam associated with the food. Handles 34 project far enough beyond the sides of the pan to facilitate an easy lifting and moving. The principle may be expanded to support any suitable size pan.

Here the heating element is shown as an alcohol based product sold under the trademark "STERNO". However, other suitable devices may be used, such as candles, small stoves, or the like. Regardless of which bent wires are selected to make a stand, the heating element is supported at a location in the stand which is high enough above the bottom of the stand so that heat from the burner does not mar an underlying supporting structure (such as a table) and low enough below a top of the stand so as not to burn a product in a utensil resting on the stand. The vertical sections of the bent wires are metal reinforcements, which rest upon surfaces of the plastic legs so that the metal reinforcements do not damage the table.

Figure 4:
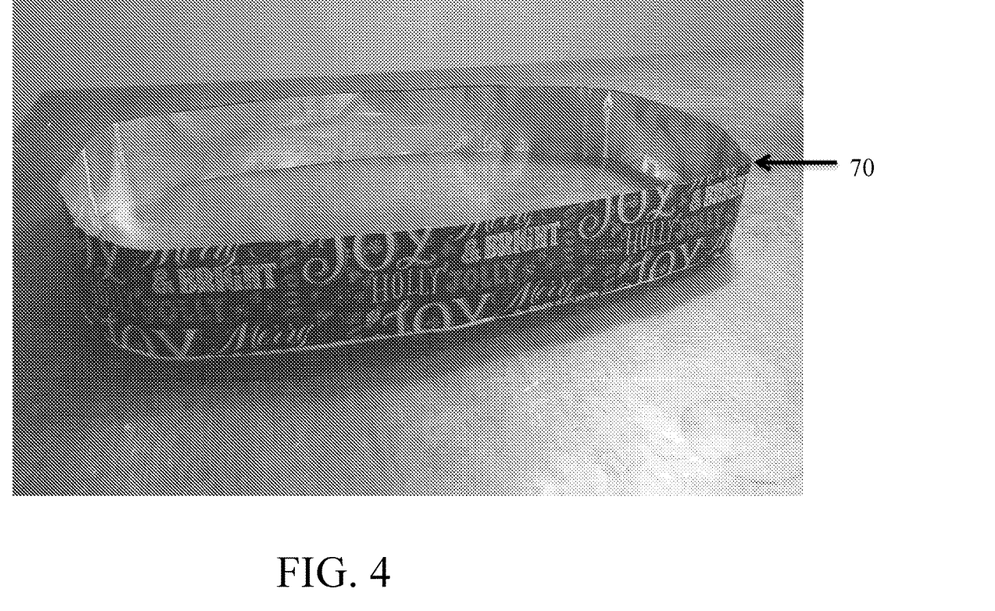
FIG. 4 is an isometric view of a decorative band or wrap, which may be from a portion of a roll or tape in accordance with the invention that may be stretched to fit around sidewalls, or a portion thereof, of a pan or tray or chafing dish of a food station and/or be adhered with adhesive on the non-decorated side of the band, wrap, roll or tape to the sidewalls, or a portion thereof, of a pan or tray or chafing dish of a food station.
Figure 5:
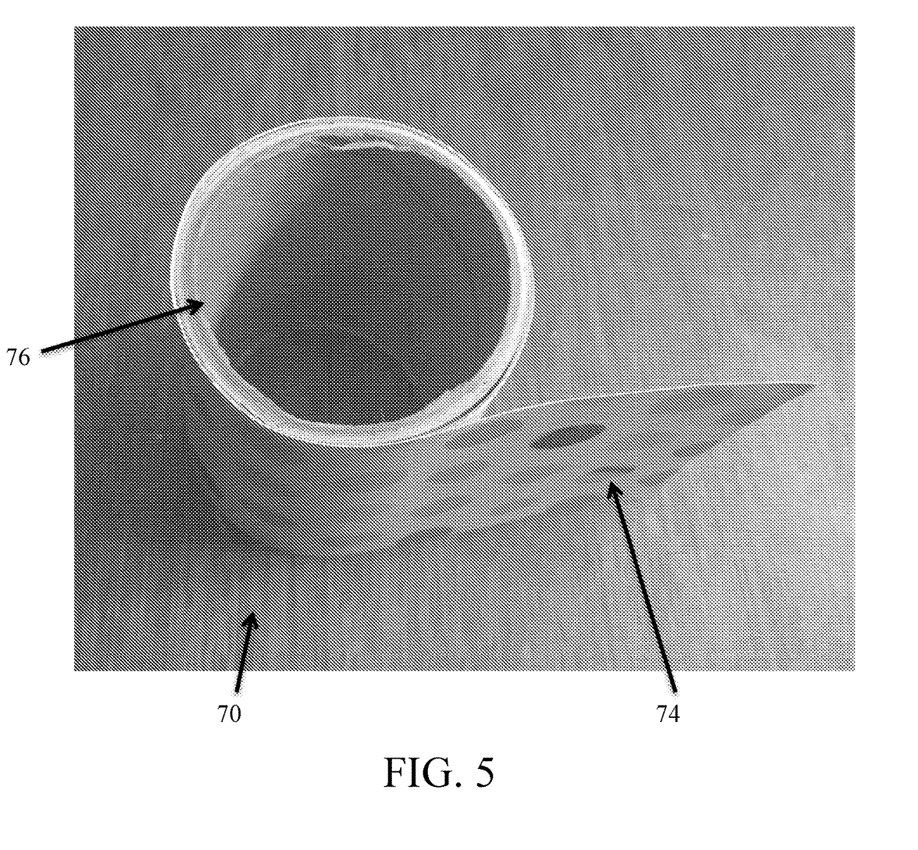
FIG. 5 is a isometric top view of a decorative roll or tape in accordance with the invention, which roll or tape is, in this figure, rolled around an inner tube from which appropriately sized portions of the decorative roll or tape may be removed and appropriately sized and then stretched to fit around sidewalls, or a portion thereof, of a pan or tray or chafing dish of a food station and/or be adhered with adhesive on the non-decorated side of the roll or tape to the sidewalls, or a portion thereof, of a pan or tray or chafing dish of a food station.

FIG. 4 depicts a flexible, properly sized decorative 'band' or 'wrap' 70, or a properly measured portion of a roll or tape 70 in an unexpanded state. FIG. 5 depicts a decorative roll or tape 70, which roll or tape is, in this figure, rolled around an inner tube, cylinder or spindle 76. Appropriately sized portions of the decorative roll or tape may be removed from the inner tube, cylinder or spindle 76 and then stretched to fit around sidewalls, or a portion thereof, of a pan or tray or chafing dish of a food station and/or be adhered with adhesive on the non-decorated side of the roll or tape to the sidewalls, or a portion thereof, of a pan or tray or chafing dish of a food station.

Preferably, the 'band', 'wrap', 'roll' or 'tape' 70 has elastic or flexible properties. The 'band,' 'wrap,' 'roll' or 'tape' 70 preferably has a decorative pattern 74 on one side and is undecorated on the remaining side. To manufacture the band, wrap, roll or tape of FIGS. 4 and 5, a sheet of aluminum foil, laminate, polymer or composite material 100 (FIG. 8) may be printed upon with the decorative pattern 74. Thereafter, the foil is cut accordingly to form the band, wrap, roll or tape 70 of FIGS. 4 and 5. For a band, the ends may be secured to each other with a conventional heat resistant and flame retardant adhesive. For a roll or tape, the material may be rolled around a tube, cylinder or spindle 76 (FIG. 5). The undecorated side may have a conventional heat resistant and flame retardant adhesive and, in that sense, appropriately sized portions of the roll or tape 70 of FIG. 5 may become a 'band' or 'wrap' 70 of FIG. 4 and/or a kind of sticker. In the case of the roll or tape, one would wrap the sidewalls of the pan or tray or chafing dish with the roll or tape and cut the roll or tape where necessary to fit onto the sidewalls in a desired manner.

Figure 6:
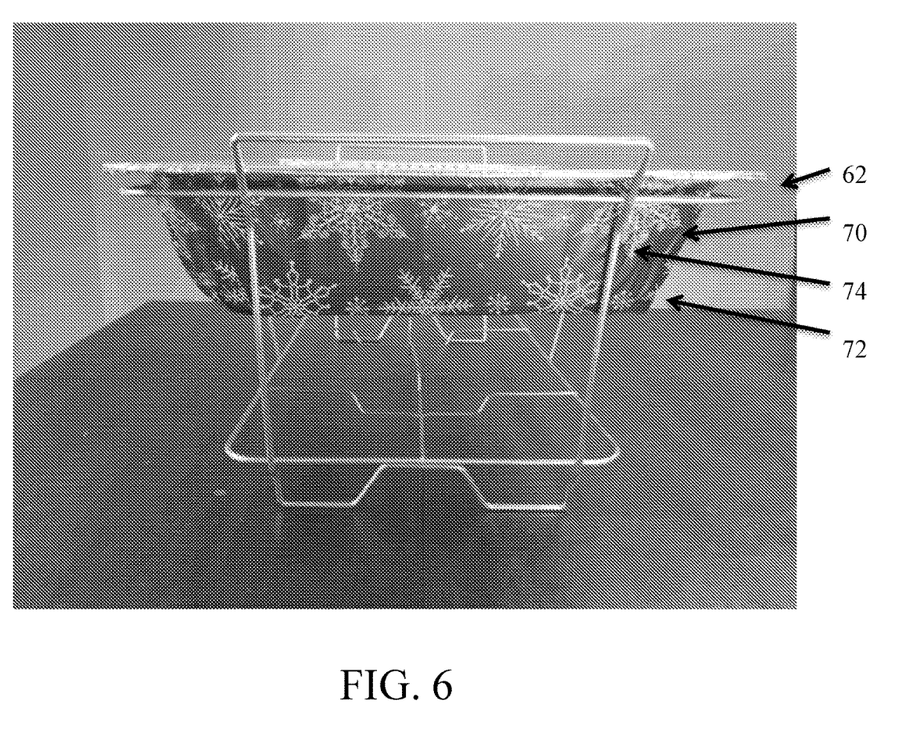
FIG. 6 is an end view of a food station in accordance with the invention with the band, wrap, roll or tape of FIGS. 4 and 5, fitted to cover the sidewalls.
Figure 7:
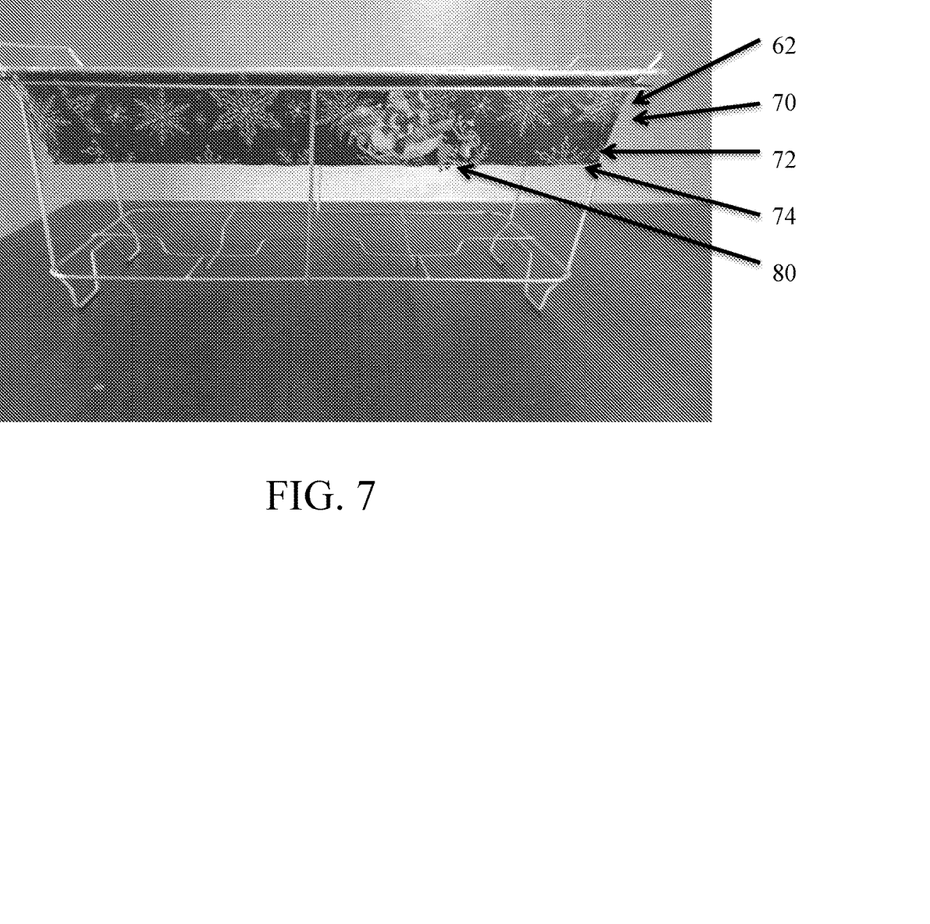
FIG. 7 is a side view of FIG. 6, also including a sticker or an embellishment adhered to the wrap, band, roll or tape.

In FIGS. 6-7, a conventional tray 62 is provided that may be nested in or replaces the water or cooking lower pan 18 of FIG. 1. The tray 62 is typically of a plain silver appearance associated with the foil or aluminum composition thereof. The size of the tray 62 can vary to include almost any dimension of length, width and depth. The typical food service related use would include the tray 62 with a width of 6-18 inches and a length of 10-24 inches with a depth of 1-5 inches. The exterior perimeter of any cooking or water pan 18 of FIG. 1 or the smaller tray 56 of FIG. 2 or the longer tray 62 of FIG. 3 may be decorated in accordance with the invention by providing a flexible, properly sized laminate, polymer, foil, or other material 'band' or 'wrap' 70, which is placed over at lest a portion of the sidewall 72 to extend at the perimeter or circumference of the pan 18 or tray 56, 62. The material of the band, wrap, roll or tape 70 will be a conventional heat resistant and fire retardant material such as those disclosed in the patents cited above and will be printed in any conventional manner disclosed herein with the decorative pattern 74 to match the décor of the event or occasion for which the pan 18 or tray 56, 62 is being used. The material is also somewhat flexible to allow it to stretch but then tightly fit over the perimeter or circumference of the pan 18 or tray 56 or 62.

The methods disclosed previously to print patterns in laminates, polymers or foils, such as in U.S. Pat. Nos. 6,773,799, 6,548,689, 5,866,207 and 5,702,806, may be used here. The novelty will be in printing the material and sizing the material as a 'wrap,' 'band,' 'roll' or 'tape' 70 to adhere to the sidewall 72 at the perimeter or circumference of cooking pans 18 or trays 56 or 62.

There are wraps, bands, tapes or rolls 70 of certain basic or often used sizes to match the various but basic sizes of the pans 18 or trays 56 or 62. As stated, the laminates, polymers and aluminum or foil compositions disclosed in the prior art are fire retardant and heat resistant and can be printed with known methods and devices and designed as wraps which would have the flexibility to fit securely around the sidewall 72 at the perimeter or circumference of the pan 18 or tray 56 or 62 of any shape.

Likewise, another embodiment includes a wrap, band, roll or tape 70 with adhesive on the inside or the non-decorated side that will contact the pan 18 or tray 56 or 62. The adhesive will be of a known heat and fire resistant composition. An embellishment or sticker 80 may be provided that is made of any conventional heat and fire retardant material (see FIGS. 7, 9 and 10). Embellishments or stickers 80 can be provided separately, or as a set, with appropriate sizes and décor. Any inks or coloring substances applied to the exterior of the embellishment 80 are likewise made of conventional heat and fire retardant materials. The embellishment or sticker 80 may be adhered to the 'band' or 'wrap' 70, or directly to the sidewalls of the pan or tray 56 or 62 with any conventional heat and fire retardant adhesive (see FIGS. 7, 9 and 10).

Figure 9:
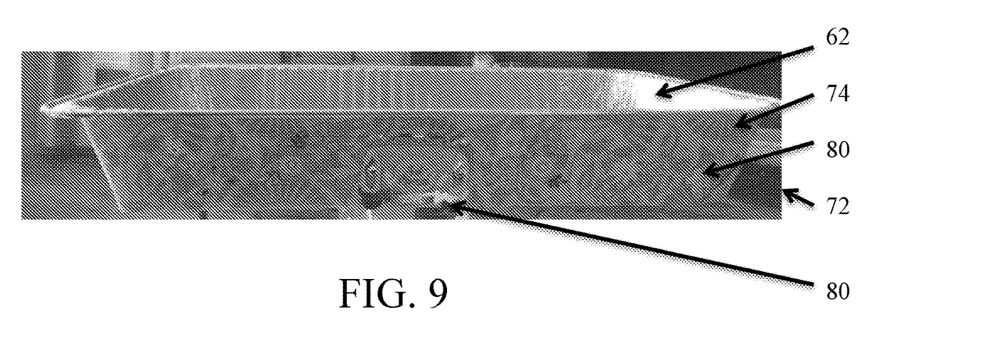
FIG. 9 is an end view of a food station wherein the sidewalls of its pan or tray are digitally printed with a pattern in accordance with the invention and wherein a sticker or an embellishment in accordance with the invention is adhered to the pattern.

In FIGS. 7 and 9, the sidewall 72, which is at the exterior perimeter of the pan 18 or tray 56 or 62, is further decorated by the embellishment or sticker 80. The embellishment or sticker 80 is a printed laminate, polymer or foil material, with an adhesive on one side and a decorative pattern 82 on the other side. In these figures, the embellishment or sticker 80 is applied to the decorated sidewall 72, but the embellishment or sticker 80 could be applied to an undecorated sidewall. The printed laminate, polymer or foil material (as the case may be) and the adhesive are heat resistant and fire retardant. The printed laminate, polymer or foil material (as the case may be) could be of any size and provided as a group or set to form several embellishments or 'stickers' that can be stuck onto the sidewall 72 of the pan 18 or tray 56 or 62 to enhance the aesthetics thereof. In this embodiment, the devices and process for the printed laminate, polymer or foil material (as the case may be), the printing of the decorative patterns, the adhesive and the manufacturing thereof, is the same as above and are conventional. However, the novel device and application would not be a wrap or roll 70 (FIGS. 4 and 5) but a 'sticker' 80 (FIGS. 7 and 9) to be applied to a cooking or water pan 18 or tray 56 or 62.

Figure 8:
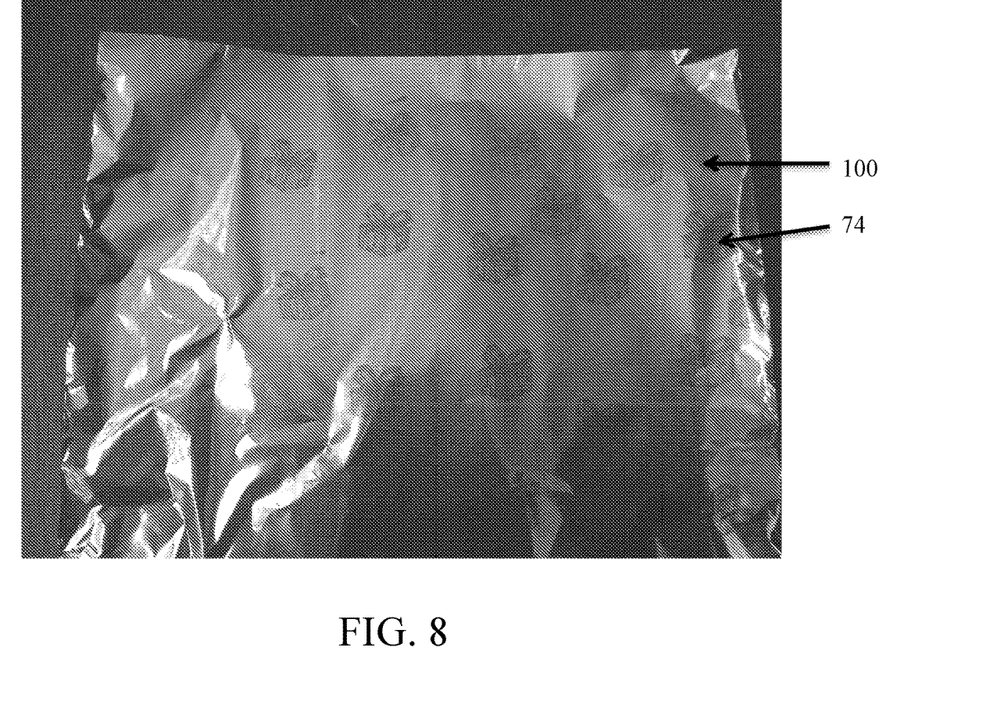
FIG. 8 is a top view of an aluminum composition printed with a decorative design in accordance with the invention prior to shaping into a pan or tray or prior to cutting same into the band, wrap, roll or tape of FIGS. 4 and 5, and sized to fit onto sidewalls of a pan or tray or chafing dish.

FIG. 8 shows yet another embodiment of this invention. It may be preferable to avoid or skip the need to adhere a wrap, band, tape or roll 70 (FIGS. 4 and 5) to the exterior of the pan. In such case, it is known in the prior art to manufacture various aluminum compositions for numerous uses including foil. See U.S. Pat. Nos. 6,548,689, 5,772,753 and 5,468,892. It is possible, as shown above and in known printing techniques, to provide patterns on such compositions. Therefore, a coated aluminum sheet is digitally printed upon to provide a decorative pattern 74 or décor prior to being shaped into a pan 18 (FIG. 1) or relatively short tray 56 (FIG. 2) or relatively long tray 62 (FIG. 3). The same can be done with a polymer or a laminate prior to being shaped into the pan 18 or tray 56 or 62. The decorative pattern 74 (or décor) is printed directly on the coated aluminum sheet prior to the shaping of the aluminum sheet into a tray or pan. The finished product will be a pan 18 or tray 56 or 62 on which is printed thereon the desired pattern or décor. In this embodiment, there is no need for the 'wrap' or the adhesives associated therewith.

The printing may be done with any conventional digital printing system that prints onto appropriately coated metallic surfaces, such as a conventional inkjet printer. The appropriate coating on the metallic surfaces may be any conventional heat resistant and flame resistant coating material that is receptive to being printed upon with ink deposition from a conventional inkjet printer. Likewise, the ink in the digital printing may be any conventional heat resistant and flame resistant ink. Embellishments 80 may be stuck to the digitally printed decorative pattern 74.

Figure 10:
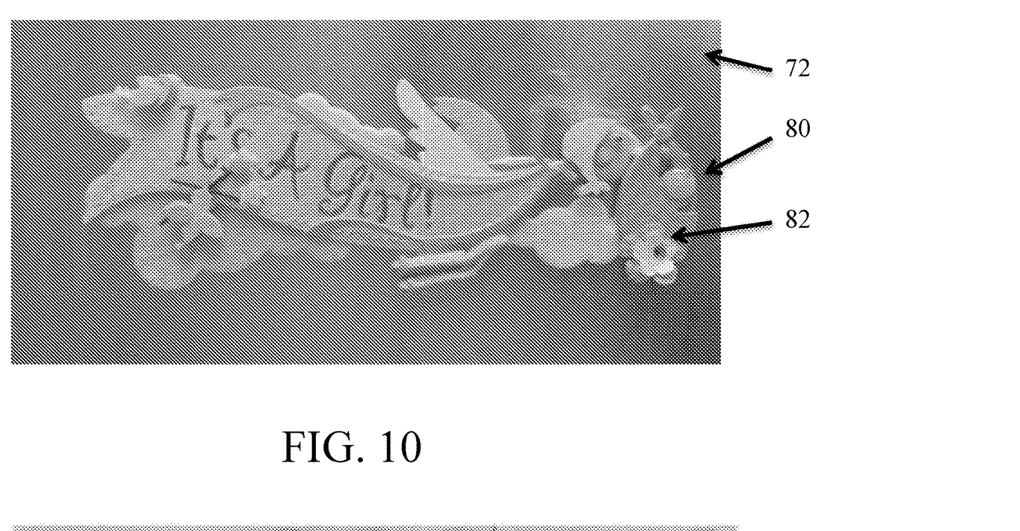
FIG. 10 is a front view of an embellishment in accordance with the invention.

FIG. 10 shows an example of the embellishment 80, which is heat resistant and flame retardant/resistant. The embellishment 80 has an outward face whose contour is preferably other than flat; that is, three-dimensional and may have curvature and thickness. The embellishment 80 of FIG. 10 is the same as the sticker 80 of FIGS. 7 and 9, showing that the sticker may be flat or have a contour that includes thickness, curvature and three-dimensionality.

As can be appreciated, the decorative pattern 74 on the band, wrap, roll or tape 70 or the decorative pattern 74 of the digital print on the sidewalls 72 and the embellishment 80 are all decorations that preferably contain different colors distributed throughout. The decorative patterns 74 may be flat (FIGS. 4, 5, 8, 11 and 12) or may have an outward face whose contour preferably has curvature so as to be three-dimensional and thus other than flat (FIG. 10). If desired, however, the outward face of the embellishment 80 could be flat, but the embellishment 80 would still appear to have a raised surface that is spaced from the sidewalls 72.

The food holder to which is applied the decoration in accordance with the invention may be an conventional pan, tray or chafing dish that is typically used to hold food and warmed from a burner. US D645296 S, whose contents are incorporated herein by reference, exemplifies a conventional chafing dish.

Figure 11:
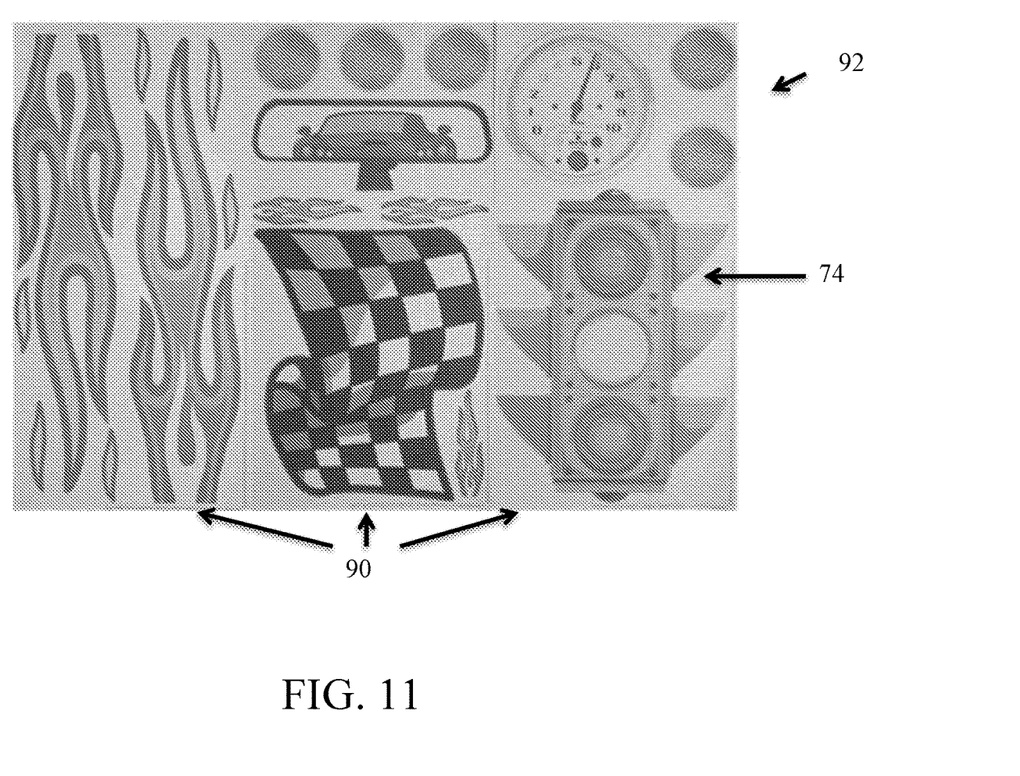
FIG. 11 is a top view of stickers on a sheet in accordance with the invention.

FIG. 11 shows flat stickers 90 on a flat sheet 92. The flat stickers 90 are pre-cut to fit onto a sidewall of a pan, tray or chafing dish. One side of the flat stickers 90 has a decoration 74 that is made from conventional materials that are heat resistant and either flame resistant or flame retardant. The flat stickers 90 have an opposite side that is undecorated and may have a conventional adhesive that is heat resistant and either flame resistant or flame retardant. The stickers 90 may be peeled in a conventional manner from the sheet 90 to expose their adhesive side and adhered directly to the sidewall 72 of the tray, pan or chafing dish or upon a decorative band or wrap 70 of FIGS. 4, 6, 7 or upon the decoration 74 of the roll 70 of FIG. 5 that is to be wrapped onto sidewalls 72 of pans, trays of chafing dishes or upon the decoration 74 from a digital print (FIG. 9) on sidewalls 72 of pans, trays or chafing dishes.

Figure 12:
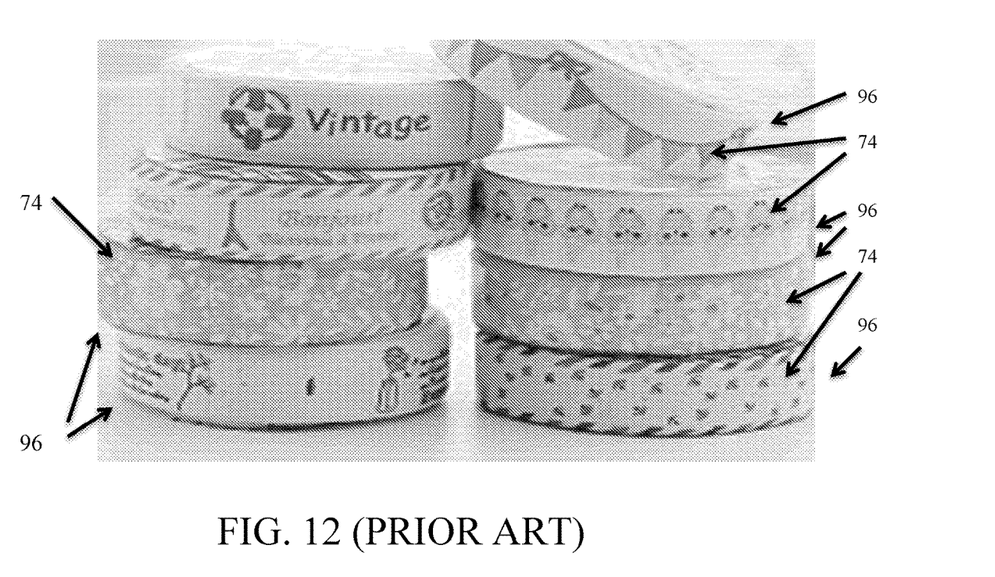
FIG. 12 is a side view of conventional, decorative, fabric tapes that are flame retardant.

FIG. 12 depicts conventional decorative fabric tapes 96 that are flame retardant. Each has one side with a decoration 74 and an opposite side with and adhesive underneath a strip that can be peeled off the adhesive. Such tapes 96 may be used in accordance with the invention by adhering portions of them to sidewalls 72 of pans, trays or chafing dishes or upon a decorative band or wrap 70 of FIG. 4 or upon the decoration 74 of the roll 70 of FIG. 5 or upon the decoration 74 (digital print on the metallic surface or coated metallic surface) of FIG. 9.

While the foregoing description and drawings represent the preferred embodiments of the present invention, it will be understood that various changes and modifications may be made without departing from the scope of the present invention.

What is claimed is:

1. A decorative food station, comprising:
a food holder having a base and having a plurality of sidewalls extending from the base, the food holder being made of a metallic material and being selected from the group consisting of at least one tray, at least one pan and at least one chafing dish, the sidewalls each having a respective exterior facing side that faces away from other sidewalls and a respective interior facing side that faces at least one of the other sidewalls; and
a decoration on or over at least one portion of the exterior facing side of at least one of the sidewalls, the decoration having different colors and being heat resistant, flame resistant or flame retardant, and retains integrity at elevated temperatures above ambient temperature, wherein the decoration is printed upon a band, wrap, roll or tape which is in a stretched condition over the at least one portion of the sidewalls, said band, wrap, roll or tape being heat resistant, flame resistant or flame retardant, and retains integrity at elevated temperatures above ambient temperature.

2. The decorative food station of claim 1, wherein the metallic material includes aluminum and the food holder is bendable to deform under manual force.

3. The decorative food station of claim 1, wherein the decoration includes a pattern that repeats design components with the different colors distributed throughout the pattern.

4. The decorative food station of claim 1, further comprising an adhesive that adheres the band, wrap, roll or tape to the at least one sidewall of the food holder, the adhesive being heat and flame resistant and retains integrity at elevated temperatures above ambient temperature.

5. A decorative food station, comprising:
a food holder having a base and having a plurality of sidewalls extending from the base, the food holder being made of a metallic material and being selected from the group consisting of at least one tray, at least one pan and at least one chafing dish; and
a decoration on or over at least one portion of at least one of the sidewalls, the decoration having different colors and being heat resistant, flame resistant or flame retardant, and retains integrity at elevated temperatures above ambient temperature, wherein the decoration is on one side of a sticker, the sticker having an opposite side upon which is an adhesive material that is adhered to the at least one portion of the sidewall, both the sticker and the adhesive material being heat resistant, flame resistant or flame retardant, and retains their integrity at elevated temperatures above ambient temperature.

6. A decorative food station, comprising:
a food holder having a base and having a plurality of sidewalls extending from the base, the food holder being made of a metallic material and being selected from the group consisting of at least one tray, at least one pan and at least one chafing dish; and
a decoration on or over at least one portion of at least one of the sidewalls, the decoration having different colors and being heat resistant, flame resistant or flame retardant, and retains integrity at elevated temperatures above ambient temperature wherein the decoration is printed on the metallic material of the at least one of the sidewalls of the food holder, the decoration including an ink material that is heat resistant, flame resistant or flame retardant, and retains integrity at elevated temperatures above ambient temperature.

7. A decorative food station, comprising:
a food holder having a base and having a plurality of sidewalls extending from the base, the food holder being made of a metallic material and being selected from the group consisting of at least one tray, at least one pan and at least one chafing dish; and
a decoration on or over at least one portion of at least one of the sidewalls, the decoration having different colors and being heat resistant, flame resistant or flame retardant, and retains integrity at elevated temperatures above ambient temperature, wherein the decoration is printed on a coating on the metallic material of the sidewalls of the food holder, the decoration including an ink material that is heat resistant, flame resistant or flame retardant, and retains integrity at elevated temperatures above ambient temperature, the coating being heat resistant, flame resistant or flame retardant, and retains integrity at elevated temperatures above ambient temperature.

8. The decorative food station of claim 1, wherein the decoration includes an embellishment whose face has a contour that is three dimensional and thus other than flat.

9. The decorative food station of claim 1, wherein the decoration includes an embellishment that is adhered to the side surface.

10. The decorative food station of claim 1, wherein one of the different colors is that of the metallic material.

11. The decorative food station of claim 1, further comprising:
a wire frame supporting the food holder.

12. The decorative food station of claim 10, further comprising:
at least one burner retained by the wire frame beneath the food holder.

13. A decorative food station, comprising:
a food holder having a base and having a plurality of sidewalls extending from the base, the food holder being made of a metallic material and being selected from the group consisting of at least one tray, at least one pan and at least one chafing dish; and
a decoration on or over at least one portion of at least one of the sidewalls, the decoration having different colors and being heat resistant, flame resistant or flame retardant, and retains integrity at elevated temperatures above ambient temperature, wherein the food holder includes two pans each with respective sidewalls with one of the two pans being more rigid and resistant to bending under manual from than a remaining one of the two pans, the more rigid pan being nested by the remaining one of the pans, the decoration being on or over the respective sidewalls of the more rigid pan.

14. A decorative food station, comprising:
a food holder having a base and having a plurality of sidewalls extending from the base, the food holder being made of a metallic material and being selected from the group consisting of at least one tray, at least one pan and at least one chafing dish; and
a decoration on or over at least one portion of at least one of the sidewalls, the decoration having different colors and being heat resistant, flame resistant or flame retardant, and retains integrity at elevated temperatures above ambient temperature, wherein the decoration is on a side of an item selected from the group consisting of a band, a wrap, a roll, a tape and a sticker, the item having another side in contact with the at least one portion of the sidewalls, further comprising:

at least one further decoration adhered onto the first-mentioned decoration with an adhesive, both the further decoration and the adhesive being heat resistant and either flame resistant or flame retardant.

15. The decorative food station of claim 14, wherein the further decoration has curvature.

16. A decorative food station, comprising:

a food holder having a base and having a plurality of sidewalls extending from the base, the food holder being made of a metallic material and being selected from the group consisting of at least one tray, at least one pan and at least one chafing dish; and a decoration on or over at least one portion of at least one of the sidewalls, the decoration having different colors and being heat resistant, flame resistant or flame retardant, and retains integrity at elevated temperatures above ambient temperature, wherein the decoration is a digital print on the metallic material of the at least one portion of the sidewalls or upon a coating on the metallic material of at least one portion of the sidewalls, further comprising:

at least one further decoration adhered onto the first-mentioned decoration with an adhesive, both the further decoration and the adhesive being heat resistant and either flame resistant or flame retardant.

17. The decorative food station of claim 16, wherein the further decoration has curvature.

\* \* \* \* \*